United States Patent Office 3,781,302
Patented Dec. 25, 1973

3,781,302
BENZOXANTHENE AND BENZOTHIOX-
ANTHENE DYESTUFFS
Otto Fuchs, Frankfurt am Main, Ernst Spietschka, Ober-
auroff, Taunus, Jürgen Hohn Kelsterbach, and Helmut
Tröster, Frankfurt am Main, Germany, assignors to
Farbwerke Hoechst Aktiengesellschaft vormals Meister
Lucius & Bruning, Frankfurt am Main, Germany
No Drawing. Filed May 20, 1971, Ser. No. 145,510
Claims priority, application Germany, May 23, 1970,
P 20 25 291.9
Int. Cl. C07d 7/42, 65/16
U.S. Cl. 260—328          6 Claims

ABSTRACT OF THE DISCLOSURE

Mixtures of isomers of benzoxanthene or benzothioxan-
thene dyestuffs of the general formulate

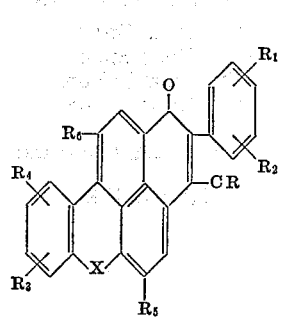

(1)

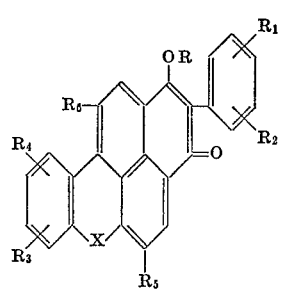

(2)

wherein X is oxygen or sulfur, R an optionally substituted
alkyl group, an acyl or arylsulfonyl group, $R_1$ and $R_2$
are hydrogen or halogen atoms, alkyl, aryl, acyl, acyloxy,
carbalkoxy, alkoxy, nitro, alkylthio or alkylsolfonyl
groups or they form together a condensed benzene ring,
$R_3$ and $R_4$ are hydrogen or halogen atoms, alkyl, alkoxy,
aryl, carbalkoxy or nitrile groups, $R_5$ and $R_6$ represent
hydrogen or optionally substituted alkoxy groups, and a
process for preparing them. The dyestuffs are very suit-
able for the dyeing of synthetic materials, especially for
the dyeing of polyethyleneglycol terephthalate. Moreover,
these dyestuffs may be used as fluorescent dyestuffs in the
mass dyeings of synthetic polymers. The resulting dyeings
are distinguished by a good fastness to light, wet process-
ing and thermofixation.

The present invention relates to new benzoxanthene and
benzothioxanthene dyestuffs and to a process for prepar-
ing them.

The new dyestuffs consist of the mixture of isomers hav-
ing the following general Formulae 1 and 2

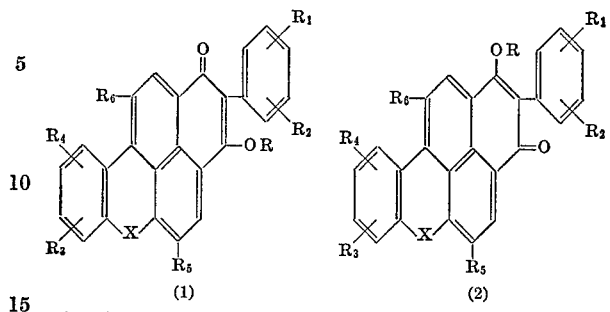

(1)                    (2)

wherein X is oxygen or sulfur, R an optionally substituted
alkyl group, an acyl or arylsulfonyl group, $R_1$ and $R_2$
are hydrogen or halogen atoms, alkyl, aryl, acyl, acyloxy,
carbalkoxy, alkoxy, nitro, alkylthio or alkylsolfonyl
groups or they form together a condensed benzene ring,
$R_3$ and $R_4$ are hydrogen or halogen atoms, alkyl, alkoxy,
aryl, carbalkoxy or nitrile groups, $R_5$ and $R_6$ represent
hydrogen or optionally substituted alkoxy groups.

The dyestuffs are obtained by heating, in the presence
of alkaline agents, benzoxanthene or benzothioxanthene-
3,4-dicarboxylic acid anhydrides of the general Formula
3 or the derivatives thereof of the general Formula 4

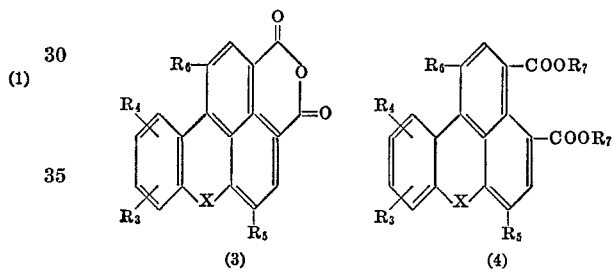

(3)                    (4)

wherein X, $R_3$, $R_4$, $R_5$ and $R_6$ have the above meanings
and $R_7$ is hydrogen or alkyl, such as methyl, with a com-
pound of the Formula 5 and/or 6

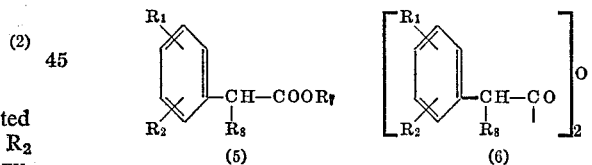

(5)                    (6)

wherein $R_1$, $R_2$ and $R_7$ have the meanings given above,
and $R_8$ is hydrogen or hydroxyl, and by alkylating or
acylating the so-obtained compounds consisting of the
mixture of isomers of the general Formulae 7 and 8

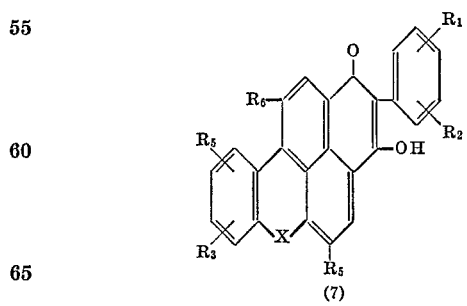

(7)

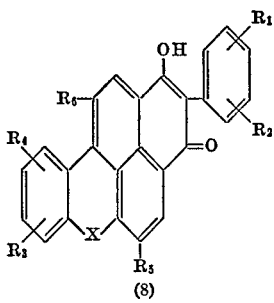

(8)

wherein X, $R_1$, $R_2$, $R_3$, $R_4$, $R_5$ and $R_6$ have the above meanings.

The radical R introduced in this way represents a straight-chained or branched alkyl group having 1 to 20 carbon atoms. As examples there may be mentioned the methyl, ethyl, n-propyl, i-propyl, n-butyl, i-butyl, octyl, dodecyl, stearyl and eicosyl radical. These alkyl groups may be substituted for example by halogen, especially chlorine or bromine, by alkoxy or acyloxy groups, especially those having 1 to 4 carbon atoms, by hydroxy, cyano or aryl, preferably phenyl groups. Furthermore R represents an aromatic acyl radical, such as benzoyl or an aliphatic acyl radical having 1 to 20 carbon atoms, as for example the acyl radicals which derive from the alkyl radicals mentioned above. R may also represent an arylsulfonyl radical such as the benzene-sulfonyl or p-toluene-sulfonyl radical. As examples for $R_1$ and $R_2$ there may be mentioned halogen, especially chlorine or bromine, alkyl groups having 1 to 20 carbon atoms, such as the groups mentioned under the meaning of R, as well as acyloxy, alkoxy, carbalkoxy, alkylthio or alkylsulfonly groups having 1 to 4 carbon atoms. Furthermore $R_1$ and $R_2$ together may form a condensed benzene ring. Examples for $R_3$ and $R_4$ are halogen, especially chlorine and bromine atoms, aryl groups, preferably phenyl, alkyl groups with 1 to 4 carbon atoms and the corresponding alkoxy or carbalkoxy groups. As examples for $R_5$ and $R_6$ there may be mentioned alkoxy groups with 1 to 4 carbon atoms, which may be substituted by halogen, preferably chlorine or bromine, by hydroxy, alkoxy or acyloxy with 1 to 4 carbon atoms or aryl, preferably phenyl.

The dyestuffs are prepared by heating the benzoxanthene or benzothioxanthene dicarboxylic acid derivatives of the Formula 3 or 4 with at least equimolar amounts, expediently in excess, of the compound of the Formula 5 and/or 6 in the presence of a base, for example an alkali metal hydroxide, -carbonate or acetate.

The condensation may be brought about within a wide temperature range and in the presence or absence of an organic solvent of a high boiling point, such as dimethylformamide, dimethylacetamide, N-methylpyrrolidone, hexamethyl phosphoric acid triamide, dimethyl - sulfoxide, o-dichloro-benzene, nitrobenzene, α-chloronaphthalene. If the condensation is effected in an organic solvent, the best temperature to be employed in each case depends on the solvent used. In general, the reaction is carried out at a temperature between 150° and 260° C., preferably between 180° and 240° C.

When condensing without an organic solvent, it is convenient to use the methylene-active component of the Formula 5 and/or 6 in excess, expediently of from 1.5 to 5 moles.

The mixture of isomers of the Formulae 7 and 8 formed during the reaction, which—depending on the amount of alkaline agent used—is obtained in form of the alkali metal salt or in mixture with the free hydroxy compound, may be isolated after acidifying the reaction mixture, for example with acetic or hydrochloric acid, in order to set free the hydroxy compound after cooling either directly, or, if no organic solvent is used, after diluting with an appropriate solvent such as dimethylformamide, ethanol, methylglycol or acetic acid in excess.

The subsequent alkylation of acylation of the hydroxy compound is brought about according to the usual method for phenols. As alkylating agents there are considered especially dialkylsulfates, alkyl halogenides, alkylene oxides and aryl sulfonic acid esters, such as dimethylsulfate, diethylsulfate, benzyl chloride, ethylene oxide, propylene oxide or p-toluene-sulfonic acid methyl ester, as acylating agents there are considered aliphatic or aromatic carboxylic or sulfonic acid chlorides or carboxylic acid anhydrides, such as acetyl chloride, propionic acid chloride, benzoyl chloride, benzene-sulfonic acid chloride or acetic acid anhydride.

The starting compounds of the Formula 3 may be obtained by heating, in the presence of copper or copper salts, (a) the diazonium salts of compounds having the Formula 9

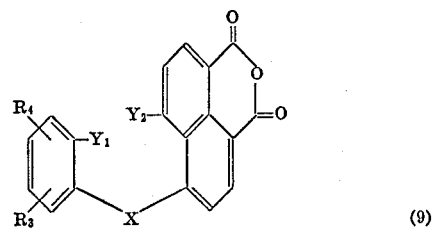

(9)

wherein X, $R_3$ and $R_4$ have the above meanings, $Y_1$ represents hydrogen and $Y_2$ an amino group or $Y_1$ an amino group and $Y_2$ represents hydrogen, or (b) the diazonium salts of compounds of the Formula 10

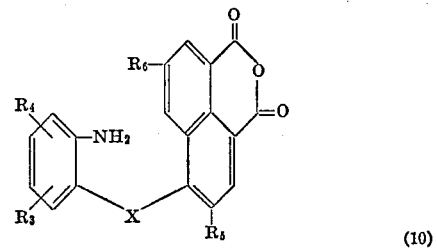

(10)

wherein X, $R_3$, $R_4$, $R_5$ and $R_6$ have the above meanings.

The new compounds obtainable according to the invention are valuable orange yellow to red dyestuffs. They are very suitable for the dyeing of synthetic materials such as for example cellulosedi-or -triacetate, especially for the dyeing of polyethylene glycol terephthalate or polycyclohexandiol-terephthalate. The resulting dyeings are distinguished by a good fastness to light, wet processing and thermofixation.

Furthermore, the products according to the invention are suitable for the dyeing of synthetic fiber-forming polymers, such as polyethylene glycol terephthalate or polyamides in the mass. Moreover, these dyestuffs may be employed as fluoroescent dyestuffs for the dyeing of synthetic polymers such as polystyrol, polyvinylchloride, polymethacrylate, polyethylene and polypropylene in the mass. On account of the partly good solubility in usual organic solvents, many of the dyestuffs to be prepared according to the invention are suitable for coloring oils, lacquers and waxes.

The following examples serve to illustrate the invention.

EXAMPLE 1(a)

A mixture consisting of 86.5 g. of benzoxanthene-3,4-dicarboxylic acid anhydride, 204 g. of phenyl acetic acid and 117.5 g. of anhydrous potassium acetate was heated for 2 hours at 220–230° C., and the water formed during condensation was distilled off through an air cooler. When the reaction was completed, the thinly liquid melt was diluted at 120° C. with 800 ml. of acetic acid, stirring was continued for 1 hour at 100–110° C. and the crystallized orange mixture of isomers of the formulae

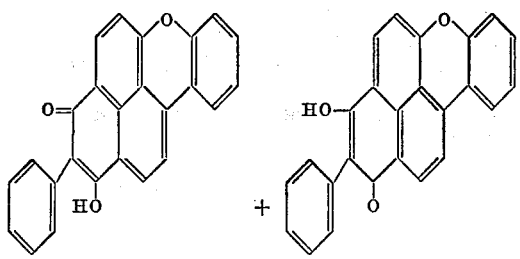

was suction-filtered at room temperature, washed with methanol and water and dried. The yield was nearly quantitative. From o-dichlorobenzene the compound crystallized in orange lamellas.

*Analysis.*—Calcd. (percent): C, 82.8; H, 3.9. Found (percent): C, 82.8; H, 4.0.

Instead of potassium acetate there may be used with the same positive result potassium carbonate or sodium hydroxide.

(b) 101.9 g. of the mixture of isomers obtained according to Example 1(a) were dissolved in 1700 g. of water, under addition of 18.8 g. of potassium hydroxide and methylated at 20–40° C. by dropwise addition of 71.4 g. of dimethylsulfate; the alkaline reaction medium was maintained by adding continuously a 10% caustic potash solution. Then the reaction mixture was heated for a short time to about 80° C. in order to remove the dimethyl-sulfate in excess. The precipitated dyestuff of the formula

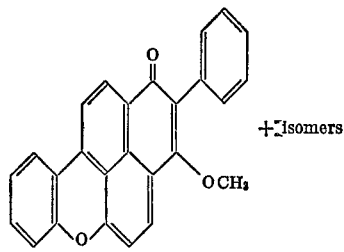

was filtered and washed neutral with water. An orange powder was obtained in a very good yield, with which brilliant orange yellow dyeings of very good fastness properties were obtained on polyester fibers.

By recrystallization from methyl glycol, the dyestuff was obtained in form of orange red needles.

*Analysis.*—Calcd. (percent): C, 83.0; H, 4.3. Found (percent): C, 82.8; H, 4.6.

(c) At pH 10–12, ethylene oxide was slowly introduced, while stirring vigorously into a solution consisting of 36.2 g. of the mixture of isomers obtained according to Example 1(a) in 600 ml. of water and 4.4 g. of sodium hydroxide. After about 2–3 hours, the precipitated dyestuff of the formula

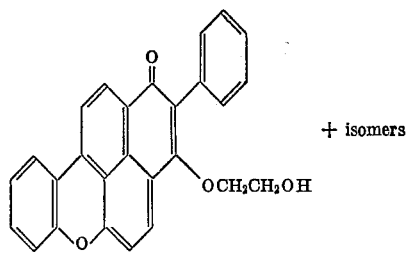

was suction-filtered, washed with diluted sodium hydroxide solution and then until neutral with water and dried. It dyes polyester materials in clear orange shades.

(d) 18.1 g. of the mixture of isomers obtained according to Example 1(a) were dissolved in 300 ml. of water under addition of 3.5 g. of potassium hydroxide, and at 70–80° C., 12.6 g. of benzyl chloride were added dropwise into this solution by stirring vigorously. Subsequently 20 ml. of a 10% caustic potash solution were added, stirring was continued for a short time and the resulting dyestuff of the formula

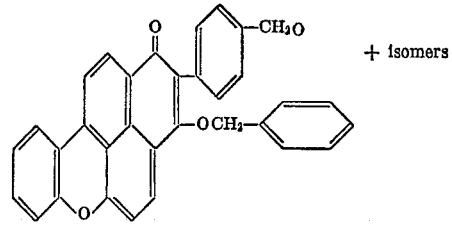

was suction-filtered, washed neutral with water and dried. Fast orange yellow dyeings were obtained on polyester fibers.

EXAMPLE 2

(a) 15.9 g. of 10-methoxybenzoxanthene-3,4-dicarboxylic acid anhydride, 7.5 g. of phenyl acetic acid and 5.0 g. of anhydrous potassium acetate weer stirred in 100 ml. of N-methyl pyrrolidone for 2.5 hours at 200–205° C. Then the reaction mixture was cooled, diluted with 150 ml. of methanol, 10 ml. of glacial acetic acid were added, and stirring was continued for several hours. The precipitated orange reaction product of the formula

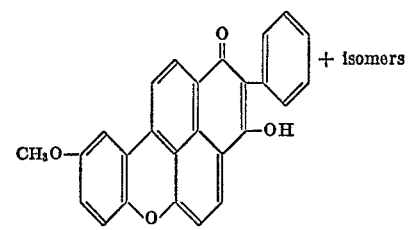

was suction-filtered, washed with methanol and water and dried. After recrystallization from o-dichlorobenzene, orange red crystals were obtained.

*Analysis.*—Calcd. (percent): C, 79.5; H, 4.1. Found (percent): C, 79.4; H, 4.1.

(b) A mixture consisting of 11.7 g. of the compound obtained according to Example 2(a), 100 g. of pyridine and 10 g. of acetic acid anhydride were refluxed for one hour. When the reaction was completed, the resulting dyestuff of the formula

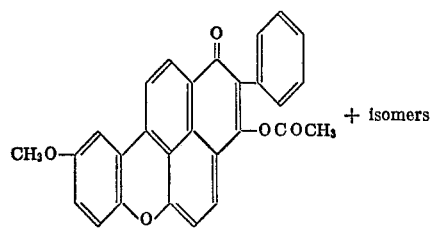

was precipitated by diluting the reaction mixture with 120 ml. of water under cooling with ice and worked up as usual. It crystallized from methyl glycol in red needles.

*Analysis.*—Calc. (percent): C, 77.5; H, 4.1. Found (percent): C, 77.8; H, 4.0.

The dyestuff dyes polyester fibres in fast orange shades.

EXAMPLE 3

23.2 g. of 9-chloro-10-methyl-benzoxanthene-3,4-dicarboxylic acid dimethyl ester, obtained by usual methylation of an alkaline solution of the dicarboxylic acid with dimethyl sulfate, 47 g. of 4-hydroxy-phenyl acetic acid and 28 g. of anhydrous potassium acetate were melted for 2.5 hours at a temperature of from 200 to 220° C. When the reaction was complete, the melt was diluted at 100° C. with 100 ml. of dimethylformamide and 50 ml. of glacial acetic acid, suction-filtered in the cold, washed with glacial acetic acid, then with water and dried. The orange red compound obtained with a very good yield corresponds to the formula

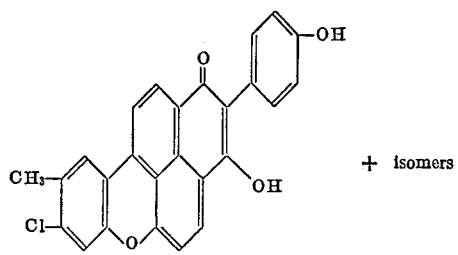

\+ isomers (b) 10 g. of the compound obtained according to Example 3(a) were refluxed for 3 hours in 150 ml. of acetic acid anhydride. The diacetyl compound of the formula

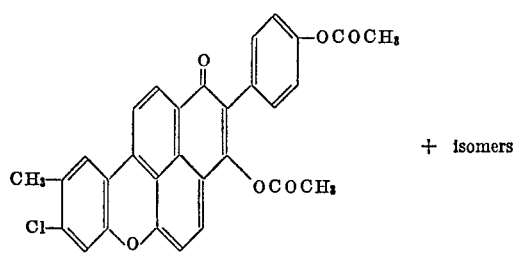

\+ isomers isolated in usual manner, dyes polystyrol and polymethacrylate in orange shades of yellow fluoresence being fast to light.

EXAMPLE 4

(a) A mixture of 176 g. of 3-methoxyphenyl acetic acid and 14.5 g. of potassium carbonate was melted on. When the generating of $CO_2$ was completed, 31.8 g. of 6-methoxybenzoxanthene-3,4-dicarboxylic acid anhydride were introduced into the melt heated to about 150° C., and the reaction mixture was heated for 2 hours to 220–230° C. After cooling to about 90° C., the melt was diluted with a mixture consisting of 400 ml. of isopropanol and 50 ml. of glacial acetic acid. The precipitated orange red condensation product of the formula

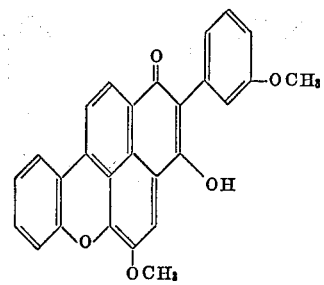

was worked up in usual manner.

(b) 19.5 g. of the compound obtained according to Example 4(a) were dissolved in 380 g. of water by addition of 3.5 g. of potassium hydroxide. At 20–40° C., 20.0 g. of diethylsulfate were added dropwise to the red solution, the pH of the mixture being maintained in the range of 10 to 11 by addition of a 10% caustic potash solution. When the ethylation was completed, the precipitated orange red dyestuff of the formula

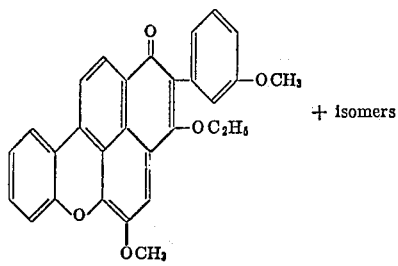

\+ isomers was isolated in usual manner. It dyes polyester fiber materials in brilliant orange red shades having a good fastness to light, wet processing and to thermofixation.

The following table contains further dyestuffs which were obtained according to the methods described in the above examples.

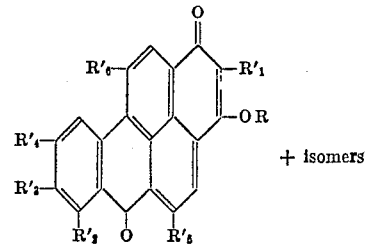

\+ isomers

| Example | R | $R_1'$ | $R_2'$ | $R_3'$ | $R_4'$ | $R_5'$ | $R_6'$ | Shade |
|---|---|---|---|---|---|---|---|---|
| 5 | $CH_3$ | —⟨⟩—$CH_3$ | $CH_3$ | H | H | H | H | Orange yellow. |
| 6 | $CH_3$ | —⟨⟩—$(CH_2)_{11}CH_3$ | H | H | H | H | H | Do. |
| 7 | $CH_3$ | —⟨⟩ ($OCH_3$) | H | Br | H | H | H | Orange. |
| 8 | $CH_3$ | —⟨⟩—Cl | H | Cl | H | H | H | Do. |
| 9 | $CH_3$ | ⟨⟩ (Cl) | H | H | $OCH_3$ | $OCH_3$ | H | Red orange. |
| 10 | $CH_3$ | —⟨⟩ | H | H | H | $OCH_3$ | $OCH_3$ | Orange red. |
| 11 | $C_2H_5$ | ⟨⟩—$OC_2H_5$ | H | Cl | $CH_3$ | H | H | Orange. |

TABLE—Continued

| Example | R | R1' | R2' | R3' | R4' | R5' | R6' | Shade |
|---|---|---|---|---|---|---|---|---|
| 12 | $C_2H_5$ | –C₆H₄–COOC₂H₅ | H | H | OCH₃ | H | H | Orange. |
| 13 | $C_2H_5$ | –C₆H₃(Cl)– | H | CH₃ | H | H | H | Orange yellow. |
| 14 | –COCH₃ | –C₆H₄–CH₃ | H | H | OCH₃ | OCH₃ | H | Red orange. |
| 15 | –COCH₃ | –C₆H₄–OCOCH₃ | H | CH₃ | CH₃ | H | H | Orange. |
| 16 | –CO(CH₂)₁₆CH₃ | –C₆H₅ | H | H | H | H | H | Do. |
| 17 | CH₂CH₂Cl | –C₆H₄–Cl | H | H | H | H | H | Do. |
| 18 | CH₂CH₂OCOCH₃ | –C₆H₅ | H | H | H | OCH₂CH₂OCOCH₃ | H | Do. |
| 19 | CH₂CH₂OCOCH₃ | –C₆H₄–OCOCH₃ | H | CH₃ | H | OCH₃ | H | Orange red. |

EXAMPLE 20

204 g. of benzothioxanthene-3,4-dicarboxylic acid anhydride, 232 g. of phenyl acetic acid and 200 g. of potassium acetate (anhydrous) were melted for 3 hours at 230° C. under distillation of the reaction water formed. When the reaction was completed, the melt was cooled to 180° C., 1000 g. of glacial acetic acid were added while stirring and refluxed for 1 hour while stirring intensively. After cooling to room temperature, the mixture of isomers was suction-filtered, washed with glacial acetic acid, then with hot water and dried. The compound of the formula

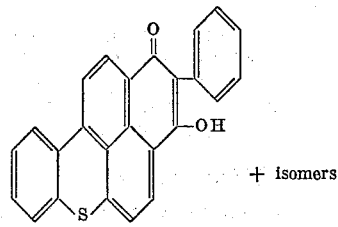 + isomers was obtained with an excellent yield and crystallized from 20 times the amount of nitrobenzene in copper-colored lamellas.

*Analysis.*—Calc. (percent): C, 79.4; H, 3.7; S, 8.5. Found (percent): C, 79.6; H, 3.7; S, 8.3.

Instead of the phenyl acetic acid there may be used with the same success phenyl acetic acid ethyl esters and the anhydride of the phenyl acetic acid.

EXAMPLE 20(a)

45.2 g. of the mixture of isomers obtained according to Example 20 were dissolved in 200 g. of dimethylformamide, 8.4 g. of potash were added and heated under reflux for ½ hour. The reaction water resulting from salification was distilled off, cooled to 60° C., 25.2 g. of dimethyl sulfate were added dropwise within 2 hours, and stirring was continued for 2 hours. The methoxy derivative obtained as a mixture of isomers was precipitated with methanol, suction-filtered washed with methanol and water and dried. The yield of the product obtained in orange red lamellas, having the formula

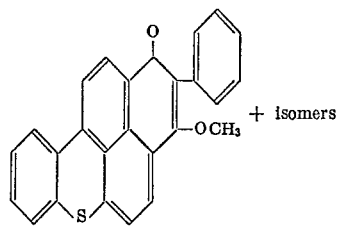 + isomers was very good. The dyestuff so-obtained was absorbed by polyester in a brilliant scarlet shade having good fastness properties.

EXAMPLE 21

16.5 g. of 9,10-dimethyl-benzothioxanthene-3,4-dicarboxylic acid anhydride were melted with 35 g. of mandelic acid and 15 g. of potassium acetate for 3 hours at 220° C. After cooling to 180° C., the whole was mixed with 150 g. of dimethylformamide, boiled for a short time and the reaction product was precipitated with 300 g. of acetic acid. After cooling to 25° C., the whole was suction-filtered, washed with acetone and then with hot water and dried. The mixture of isomers having the following constitution

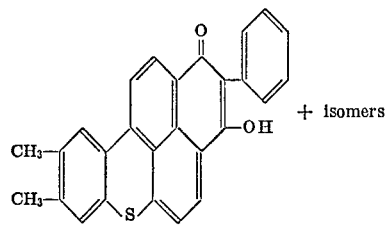 + isomers was obtained with a good yield in form of red scales having metallic luster. Instead of mandelic acid, there may also be used the equivalent amount of mandelic acid ethyl ester.

EXAMPLE 21(a)

20 g. of the mixture of isomers obtained according to Example 21 were dissolved hot in 280 g. of pyridine, cooled to 0° C., and at this temperature 7.7 g. of benzoyl chloride were added dropwise in half an hour. Stirring was continued at 0° C., then at 25° C., until the reaction was completed. The mixture of isomers of the benzoyl derivative was precipitated with water, suction-filtered, washed with water and dried. The dyestuff having the following constitution, dyes polyester in a brilliant bluish red shade.

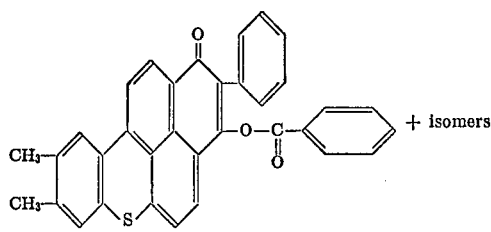

EXAMPLE 22

6.4 g. of 9-methoxy-benzothioxanthene-3,4-dicarboxylic acid anhydride were heated to the boil with 4.3 g. of 3-chloro-phenyl acetic acid, under addition of 2 g. of potassium acetate in 50 g. of N-methyl pyrrolidone, the reaction water formed being distilled off. When the reaction was completed, the whole was cooled to 25° C., mixed with 100 g. of a 2 N acetic acid, suction-filtered and washed with acetone and water. The yield of the product obtained in dark red scales having the formula

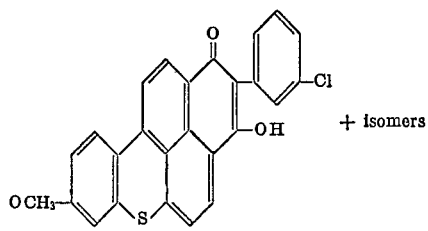

was very good.

Similar good results were obtained when the condensation was brought about in dimethylformamide, o-dichlorobenzene and α-chloro-naphthalene.

EXAMPLE 22(a)

15 g. of the mixture of isomers obtained according to Example 22 were dissolved in 150 ml. of pyridine; 15 g. of acetic acid anhydride were added dropwise while stirring and boiled at reflux for 2 hours. Then, the whole was cooled, suction-filtered washed with water and dried. The bluish red acetyl derivative of the formula

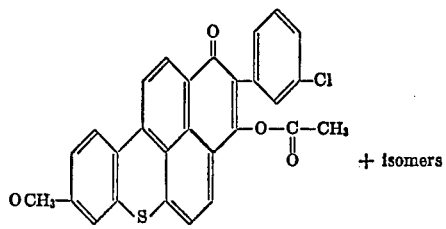

dyes polyester fabrics in a bluish red shade.

EXAMPLE 23

20 g. of 6-methoxy-benzothioxanthene-3,4-dicarboxylic acid anhydride were melted with 30 g. of phenyl acetic acid and 10 g. of potassium acetate at 210° C. for 1½ hours. When the reaction was finished, 80 g. of dimethylformamide were added at 180° C., the whole was boiled for a short time, and the reaction product was precipitated with 160 g. of glacial acetic acid. The mixture of isomers, obtained in bluish red scales of the following formula

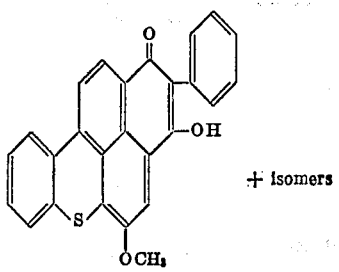

was worked up in usual manner.

EXAMPLE 23(a)

10 g. of the mixture of isomers obtained according to Example 23 were heated under slight reflux in 45 g. of pyridine and 15 g. of acetanhydride for 3 hours. When the reaction was completed, the whole was cooled to 0° C., suction-filtered and washed with methanol. The bluish red mixture of isomers of the formula

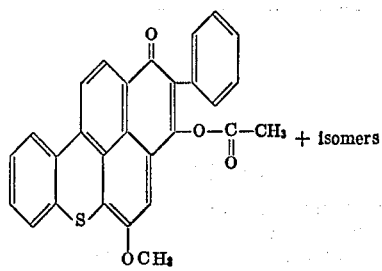

dyes polystyrene and hard PVC in brilliant bluish red shades being fast to light.

EXAMPLE 23(b)

10.2 g. of the mixture of isomers obtained according to Example 23 were dissolved in 200 g. of water while adding 2.5 g. of potassium hydroxide and the solution was methylated with 10 g. of dimethyl-sulfate according to Example 1(a).

When the reaction was complete, the precipitated dyestuff of the formula

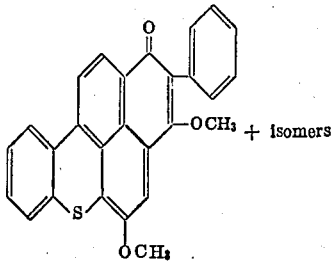

was suction-filtered and washed with water until neutral. The dyestuff obtained in a good yield dyes polyester fibers brilliant bluish red shade and has, as a bluish red fluorescent dyestuff, good fastness properties for unplasticized PVC and polystyrene.

EXAMPLE 24

19.2 g. of 9-bromo-benzothioxanthene-3,4-dicarboxylic acid anhydride were melted with 28 g. of naphthyl acetic acid under addition of 15 g. of potassium acetate as condensating agent for 2 hours at 200° C., the resulting reaction water being distilled off. After cooling to 180° C., 100 g. of dimethylformamide were added, the whole was boiled for a short time and cooled. The mixture of isomers obtained in red scales, having the formula

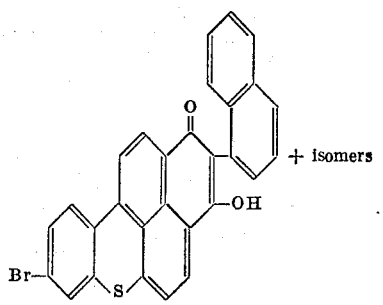

was isolated as usual. From 5 times the amount, o-dichlorobenzene was recrystallized for purification.

EXAMPLE 24(a)

3.9 g. of the mixture of isomers obtained in Example 24 were dissolved in 150 g. of $H_2O$ and 60 g. of methanol under addition of 1.5 g. of KOH at 70–80° C.; the whole was cooled to 40° C., 11 g. of dimethylsulfate were slowly added dropwise, the pH (pH 10) being maintained, and stirring was continued for 2 hours. The methylation product of the formula

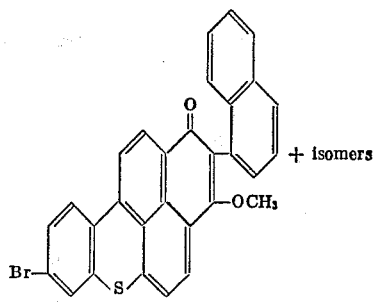

was precipitated from the reaction solution, suction-filtered, washed with diluted KOH, then with water and dried. The dyestuff was absorbed by polyester yielding a brilliant scarlet shade, having a very good fastness to light and a very good fastness to thermofixation and wet processing.

EXAMPLE 25

7.9 g. of 8-methyl-benzothioxanthene-3,4-dicarboxylic acid anhydride were melted with 10.5 g. of p-diphenyl acetic acid under addition of 8 g. of potassium acetate at 210° C. for 1½ hours. The hot melt was dissolved in 50 g. of dimethylformamide and the reaction product was precipitated with 70 g. of glacial acetic acid, suction-filtered and washed with methanol and water. The so-obtained mixture of isomers of the following constitution was obtained in orange red scales.

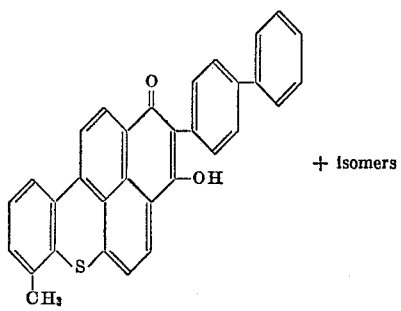

EXAMPLE 25(a)

10 g. of the mixture of isomers obtained in Example 25 were dissolved in 200 g. of water under addition of 2.5 g. of KOH; the pH value (pH 11) being controlled, ethylene oxide was slowly added thereto. The mixture of isomers of the ethoxy derivative was precipitated from the reaction solution, suction-filtered, washed with water to free it from the alkaline agent and dried. The product obtained in orange red scales having the constitution

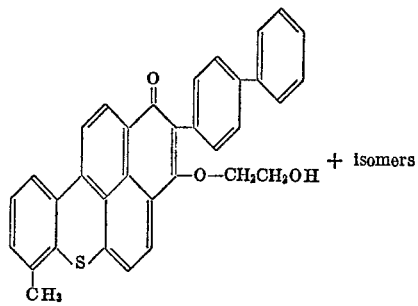

was absorbed by polyester in a brilliant scarlet shade.

EXAMPLE 26

10 g. of benzothioxanthene-3,4-dicarboxylic acid anhydride were refluxed for 2 hours with 15 g. of 4'-dodecyl-phenylacetic acid and 10 g. of potassium acetate in 50 g. of N-methylpyrrolidone, the resulting reaction water being distilled off. Subsequently the whole was mixed with 800 g. of acetone and filtered from the precipitated salt, the acetone was eliminated at the rotation evaporator, and the reaction product having the constitution

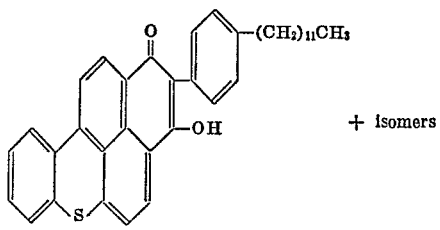

was precipitated with methanol.

EXAMPLE 26(a)

10.9 g. of the reaction product described in Example 26 were dissolved in 500 g. of a mixture consisting of water and isopropanol 2:3 under addition of 2 g. of potassium hydroxide, adjusted to pH 10; 2 g. of methyl chloride were introduced and heated to 100° C. for 5 hours in an autoclave by addition of 3 g. of potassium carbonate. The starting material which has not been reacted was isolated from the precipitated methylation product having the constitution

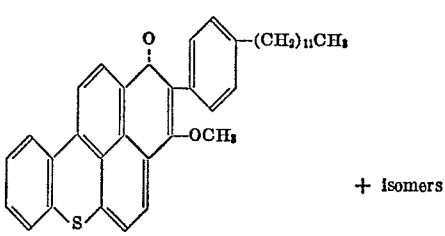

by treating it with an alkaline agent. The so-obtained mixture of isomers dyes hard PVC in a brilliant orange shade.

The following table lists further dyestuffs which were obtained in analogy to the above examples.

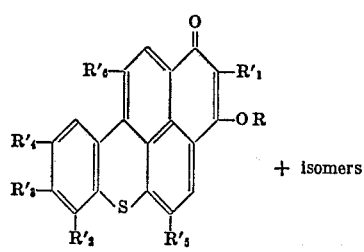

| Example | R | R₁' | R₂' | R₃' | R₄' | R₅' | R₆' | Shade (polyester or polystyrol) |
|---|---|---|---|---|---|---|---|---|
| 27 | —CH₃ | —C₆H₄—OCH₃ (p) | H | CH₃ | CH₃ | H | H | Red. |
| 28 | —CH₃ | —C₆H₄—CH₃ (p) | H | H | H | OCH₃ | H | Bluish red. |
| 29 | —CH₃ | —C₆H₄—C₆H₅ (p) | H | H | CH₃ | H | H | Yellowish red. |
| 30 | —CH₃ | naphthyl | H | Br | H | H | H | Do. |
| 31 | —C(O)—CH₃ | —C₆H₄—(CH₂)₁₁CH₃ | H | H | Br | H | H | Bluish red. |
| 32 | —C₂H₅ | —C₆H₄—OCH₃ (with CH₃O) | CH₃ | H | H | OCH₃ | H | Do. |
| 33 | —C₂H₅ | —C₆H₄—Cl | H | OCH₃ | H | H | H | Yellowish red. |
| 34 | —C₂H₅ | —C₆H₄—Cl | CH₃ | H | H | H | H | Do. |
| 35 | —CH₃ | —C₆H₃—Cl,Cl | H | OCH₃ | H | H | H | Do. |
| 36 | —CH₃ | —C₆H₃(CH₃)(CH₃) | H | H | OCH₃ | H | H | Bluish red. |
| 37 | —C₂H₅ | —C₆H₃—C(CH₃)₃, C₂H₅ | H | H | H | OCH₃ | OCH₃ | Do. |
| 38 | —C₂H₄OH | —C₆H₃(CH₃)(CH₃) | CH₃ | H | H | H | H | Yellowish red. |
| 39 | —C₂H₄OH | —C₆H₄—NO₂ | H | H | H | OCH₃ | H | Red. |
| 40 | —C(O)—CH₃ | naphthyl | H | CH₃ | CH₃ | H | H | Bluish red. |
| 41 | —C(O)—CH₃ | —C₆H₄—C₆H₅ | H | H | OCH₃ | H | H | Do. |
| 42 | —C(O)—C₆H₅ | —C₆H₄—CH₃ | CH₃ | H | H | OCH₃ | OCH₃ | Do. |
| 43 | —C(O)—C₆H₅ | —C₆H₄—OCH₃ | H | OCH₃ | H | H | H | Do. |
| 44 | —CH₃ | —C₆H₄—SCH₃ | H | CH₃ | H | H | H | Red. |
| 45 | —SO₂—C₆H₅ | —C₆H₄— | H | H | H | H | H | Bluish red. |
| 46 | —SO₂—C₆H₄—CH₃ | —C₆H₄—OCH₃ | H | CH₃ | CH₃ | H | H | Do. |

We claim:
1. Mixture of a benzoxanthene or benzothioxanthene dyestuff of the formula

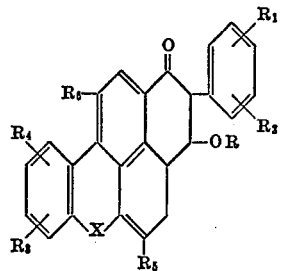

with the isomer thereof of the formula

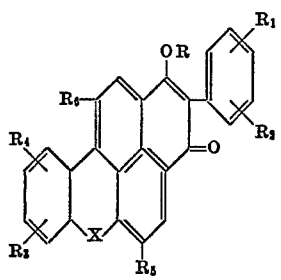

wherein
X is sulfur or oxygen, R is alkyl of 1 to 20 carbon atoms, alkyl of 1 to 20 carbon atoms substituted by chlorine, bromine, alkoxy of 1 to 4 carbon atoms, hydroxy, cyano or phenyl, benzoyl, alkanoyl of 1 to 20 carbon atoms, benzene sulfonyl or p-toluene sulfonyl, $R_1$ and $R_2$ are hydrogen, chlorine, bromine, phenyl, alkyl of 1 to 20 carbon atoms, alkanoyloxy of 1 to 4 carbon atoms, alkoxy of 1 to 4 carbon atoms, alkoxycarbonyl of 2 to 5 carbon atoms, nitro, alkylthio of 1 to 4 carbon atoms or alkylsulfonyl of 1 to 4 carbon atoms or, when together and adjacent, are —CH=CH—CH=CH— to form a fused benzene ring,
$R_3$ and $R_4$ are hydrogen, chlorine, bromine, cyano, carbalkoxy of 1 to 4 carbon atoms, phenyl, alkyl of 1 to 4 carbon atoms or alkoxy of 1 to 4 carbon atoms, and
$R_5$ and $R_6$ are hydrogen, alkoxy of 1 to 4 carbon atoms which may be substituted by chloro, bromo, hydroxy, alkoxy of 1 to 4 carbon atoms, alkanoyloxy of 1 to 4 carbon atoms or phenyl.
2. The dyestuff consisting of the mixture of isomers of the formulae

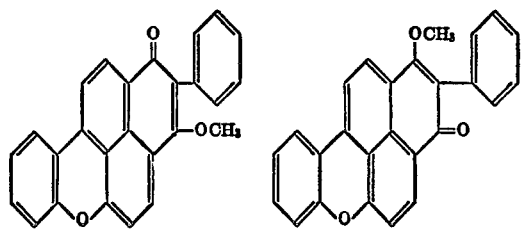

3. The dyestuff consisting of the mixture of isomers of the formulae

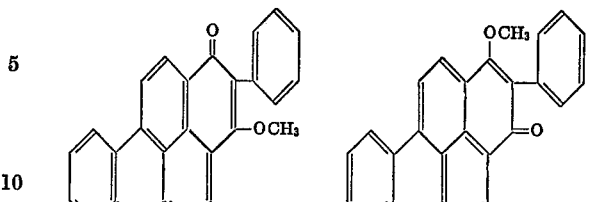

4. The dyestuff consisting of the mixture of isomers of the formulae

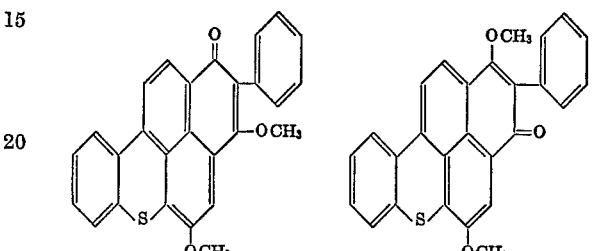

5. The dyestuff consisting of isomers of the formulae

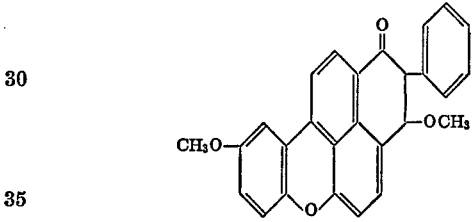

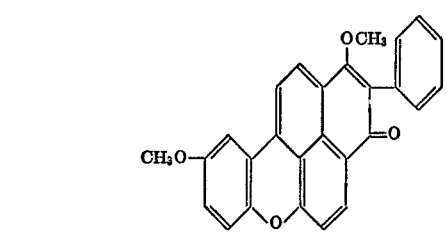

6. The dyestuff consisting of the mixture of isomers of the formulae

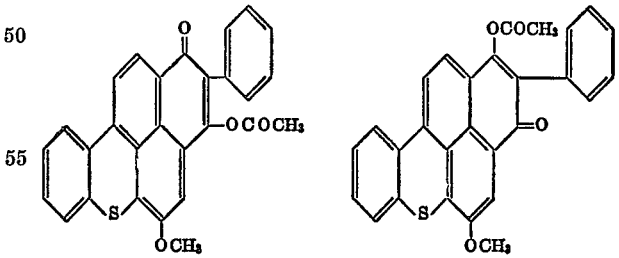

References Cited
Weiss et al.: "Tetrahedron Letters," No. 49, pp. 4325–28 (1969).

HENRY R. JILES, Primary Examiner
R. T. BOND, Assistant Examiner

U.S. Cl. X.R.
8—4, 162 B, 179; 260—335